US008263525B1

(12) United States Patent
Skandan et al.

(10) Patent No.: US 8,263,525 B1
(45) Date of Patent: *Sep. 11, 2012

(54) NANOPARTICLE SORBENT FOR EFFICIENT MERCURY REMEDIATION FROM CONTAMINATED WATER

(75) Inventors: Ganesh Skandan, Easton, PA (US); Mohit Jain, East Brunswick, NJ (US)

(73) Assignee: NEI Corporation, Piscataway, NJ (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/787,749

(22) Filed: May 26, 2010

Related U.S. Application Data (60) Provisional application No. 61/217,099, filed on May 27, 2009.

(51) Int. Cl.
| | |
|---|---|
| B01J 20/00 | (2006.01) |
| C01B 31/08 | (2006.01) |
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |

(52) U.S. Cl. ........ 502/400; 502/407; 502/416; 502/417; 428/403; 428/404
(58) Field of Classification Search ........ 502/400, 502/407–413, 416–417, 425; 210/688, 914; 428/403, 404
See application file for complete search history.

(56) References Cited

U.S. PATENT DOCUMENTS

| 5,916,934 A * | 6/1999 | Mahmud et al. ........... 523/215 |
| 5,919,855 A * | 7/1999 | Reed et al. ............... 524/496 |
| 6,191,194 B1 * | 2/2001 | Anand et al. ............. 523/212 |
| 6,719,828 B1 * | 4/2004 | Lovell et al. ............... 95/134 |
| 6,787,029 B2 * | 9/2004 | Gaudet et al. ........... 210/198.2 |
| 7,557,064 B2 * | 7/2009 | Zhou et al. ............... 502/407 |
| 7,628,844 B2 * | 12/2009 | Hua ......................... 95/134 |

OTHER PUBLICATIONS

Bailey et al., "A Review of Potentially Low-Cost Sorbents for Heavy Metals", Wat. Res. vol. 33, No. 11, pp. 2469-2479, 1999.*
Dong et al., "Engineering and characterization of mesoporous silica-coated magnetic particles for mercury removal for industrial effluents", Applied Surface Science, vol. 354, Issue 11, Mar. 30, 2008, pp. 3522-3530. Published Online Dec. 3, 2007.*

* cited by examiner

Primary Examiner — Stanley Silverman
Assistant Examiner — Anthony J Zimmer
(74) Attorney, Agent, or Firm — William L. Botjer (57) ABSTRACT

A new class of sorbents for the removal of mercury from contaminated water. The optimum structure of the sorbent particles and a method to produce the same is described. The newly developed carbon-based particles are differentiated from other sorbent particles by their high accessible surface area and high affinity towards mercury ions that leads to faster and higher mercury adsorption. The sorbent is based on carbon particles with a metal-oxide coating on the surface. The metal-oxide is coated on the surface of carbon, using a solution-based method. The metal-oxide coated carbon was further modified with sulfur molecules, to increase its mercury removal capacity.

21 Claims, 14 Drawing Sheets

NANOPARTICLE SORBENT FOR EFFICIENT MERCURY REMEDIATION FROM CONTAMINATED WATER

CROSS REFERENCE TO RELATED APPLICATIONS

This application claims priority of U.S. provisional application No. 61/217,099 filed May 27, 2009 the disclosure of which is hereby incorporated by reference.

This application is also related to U.S. patent application Ser. No. 12/776,577 filed May, 10, 2010 entitled "Environmentally Benign Sorbents for Removing Mercury from Flue Gas" the disclosure of which is hereby incorporated by reference.

STATEMENT OF GOVERNMENT SUPPORT OF INVENTION

The work leading to the present application was done as part of DOE Grant Number: DE-FG02-08ER85144.

BACKGROUND OF THE INVENTION

Various Department of Energy sites, such as the Y-12 Plant in Oak Ridge, Tenn., used mercury extensively for the production of weapons. Some of the mercury used at these sites has been released to local aquatic systems. It is estimated that approximately 330 metric tons of mercury was discharged from the Y-12 plant to the local environment, between 1953 and 1963. Further, some other sites, such as the Savannah River are contaminated with mercury from industrial plants like chloro-alkali plants, which produced chlorine. Coal-fired power plants generate various gaseous pollutants, such as sulfur dioxide, carbon dioxide, and heavy metals. The majority of these pollutants are responsible for adverse effects on humans, animals, and plants. The proposed Clean Air Interstate Rule (CAIR) requires the reduction of the emission of sulfur dioxide to the environment. Sulfur dioxide is one of the components responsible for acid rain. Since sulfur emission rules are becoming increasingly stringent, more and more power plants are installing wet flue gas desulfurization (FGD) systems for $SO_2$ control. One of the co-benefits of these systems is that they capture mercury and other trace metals from the flue gas. However, most of these systems have a water blowdown stream, which leads to the discharge of mercury. Since mercury discharge limits are becoming more stringent, there is a need for highly efficient water treatment technologies to remove mercury prior to discharging the FGD waste stream to the surface water.

In aquatic systems, mercury is bio-accumulated up the aquatic food chain reaching toxic concentrations in large fish and the animals that feed on fish. In an EPA study, it was observed that the accumulation factor (water column to base tissue) in the Savannah River is 4,000,000, i.e. methylmercury is 4 million times more concentrated in the fish tissue than in the water column. The EPA has set the maximum contaminant level goals (MCLG) for mercury to be 2 ppb.

Over the years, a number of different sorbents have been developed to capture mercury from aquatic systems. These include activated charcoal, amine-containing polymers, ion-exchange resins, chelating resins, modified clays, zeolites, pozzolana, modified silica [Soliman, E. M., Saleh, M. B., Ahmed, S. A., Anal. Chem. Acta, v523, 2004, 133] and modified alumina. One of the major problems with some of these sorbents, such as ion-exchange resins, is the lack of selectivity which makes them less efficient in the presence of competing ions such as $Ca^{2+}$ and $Mg^{2+}$. Further, a high amount of total dissolved solids (TDS) makes ion exchange resins less effective. A major issue with the currently used sorbent materials is the lack of accessibility of the mercury ions to the internal surface area where the chelating/coordinating ligands are present, leading to reduced mercury sorption capacity despite a high specific surface area ($m^2/g$).

SUMMARY OF THE INVENTION

The present invention is directed to a new type of sorbent for removing mercury from water. The key characteristic of the sorbent particle is that it has a highly accessible internal surface to mercury ions and selectivity towards mercury adsorption. Certain types of activated carbon based sorbents have high surface area; however, these surfaces, or the mercury adsorption groups present on these surfaces, are not readily accessible to mercury ions. This leads to a sorbent that has low mercury adsorption kinetics and capacity. Certain types of non-carbon based sorbents such as ion-exchange resins have accessible functional groups, but the concentration of these functional groups is low. Additionally, they lack selectivity towards mercury ions. The present invention overcomes the limitations of currently available carbon and non-carbon based sorbents by incorporation of a thin metal-oxide layer on the surface of particles that have high accessible surface area, followed by functionalization of this metal oxide layer with groups that are specific for mercury adsorption.

The sorbent described in the present invention is based on carbon (carbon black is a common form of carbon, and is made up of aggregated nanoscale particles of carbon produced by a vapor condensation process), which has a highly accessible internal surface. Any other material that has similar 'fractal' morphology could be used as well. Activated carbon is another form of carbon that has a high surface area as well. Those skilled in the art will recognize that carbon black and activated carbon can be interchanged with each other, provided the surface area of the two powders is similar. This is particularly relevant to the present invention since it pertains to only surface modification of the particles. The thin metal-oxide layer acts as a template that allows surface functionalization. Both the metal-oxide coating on the surface of carbon and the functionalization of coating are achieved by a solution-based method.

Two critical aspects that differentiate the newly developed sorbent for mercury removal from water from other sorbent particles for similar applications include: (i) a suitable surface modification of particles with readily accessible internal surface to increase their adsorption efficiency for mercury, (ii) a high mercury removal rate, and (iii) a high mercury loading per unit weight. The sorbent disclosed in this application has superior performance to at least three commercially available sorbents, some of them designed specifically for mercury.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Overview

A. The template material used as a sorbent is carbon black, as carbon based materials are readily available. Other types of carbon particles that have similar open morphology can also be used. Additionally, other non-carbon materials, such as ceramic oxides, ceramic non-oxides, or clay-based particles can also be used as template for further surface modification. The starting carbon black is an aggregate of nanometer sized carbon particles, which gives it a high surface area (specific surface area: 260 $m^2/g$), in addition to the open pore structure. There is flexibility in the size of the nanoparticles, which can range from 10 nm to as much as 70 nm. Primary particles of less than 10 nm will likely not lead to an open structure (with respect to mercury) and particles greater than 70 nm will lead to a relatively low surface area. The range of surface area can be between 80 $m^2/g$ and 250 $m^2/g$. Below 80 $m^2/g$ the total available surface is too low and above 250 $m^2/g$ the material will behave more like standard activated carbon. Note that the particle size and surface area can vary substantially depending upon the material composition.

B. The surface of the carbon particles was modified using a two-step process. During the first step, the surface was modified with aluminum hydroxide functional groups which form a "tying layer" to increase the adhesion between the inorganic substrate and the metal oxide layer that follows. An aqueous solution of sodium aluminate was used as the precursor for aluminum hydroxide deposition. Sodium aluminate was transformed to aluminum hydroxide by treating it with an ion-exchange resin. The resin exchanges sodium ions to hydrogen ions. It should be noted that other inorganic compounds such as: titanium hydroxide, magnesium hydroxide, iron hydroxide, and copper hydroxide can also be used as the tie layer prior to deposition of metal oxide layer.

C. The surface of carbon was further modified with a metal oxide, during the second step. In our work, we used silica because it is the least expensive among oxides and allows for easy surface modification. Other commonly known oxides, including aluminum oxides, titanium oxide, iron oxide and tin oxide can be used instead. Sodium silicate was used as silicon oxide source. An aqueous solution of sodium silicate was treated with ion-exchange resin to exchange sodium ions with hydrogen ions. The amount of silica on the surface of carbon is about 7-16% and preferably about 8-13% and more preferably about 10-12 wt % of the total powder.

D. Silica coated carbon was further modified with sulfur containing functional groups to increase their mercury removal capacity. Incorporation of these groups was achieved by reacting ethoxy groups of mercaptosilane, which contains thiol (SH) groups, with hydroxyl groups present on the surface of silicon oxide layer. Another chemical which was used for surface modification was calcium polysulfide, which contains polymeric sulfur chain. Other chemicals which can be used are mercapto acetic acid and elemental sulfur, precipitated using sodium thiosulfate.

E. The unique feature of the present sorbent is the presence of silica coating on the surface of carbon, which has highly accessible internal surface. Since the coating is a few nanometers thick, it conforms to the shape of carbon nanoparticles, hence still leaves the internal surface accessible to mercury ions. Additionally, the oxide nature of the coating makes it easy to functionalize with chemical moieties, which are specific for mercury adsorption.

Example 1

Synthesis and Performance of Thiol Group Modified Carbon-Black Based Sorbent 1.a. Surface Modification with Sodium Aluminate A typical process for introducing aluminum hydroxide groups on the surface of carbon black is as follows: 60 g of carbon black was dispersed in 5400 mL of water, using a high shear mixer. 1.2 g of sodium aluminate was dissolved in 360 mL of water, in a separate container. The aqueous solution of sodium aluminate was passed through an ion-exchange resin (Dowex-HCR-W2) prior to the addition to carbon black slurry. The pH of the solution was maintained between 9.7 and 9.8 using an aqueous solution of sodium hydroxide and hydrochloric acid. The treated powder was filtered and dried in an oven.

1.b. Surface Modification with Sodium Silicate

Figure 1:
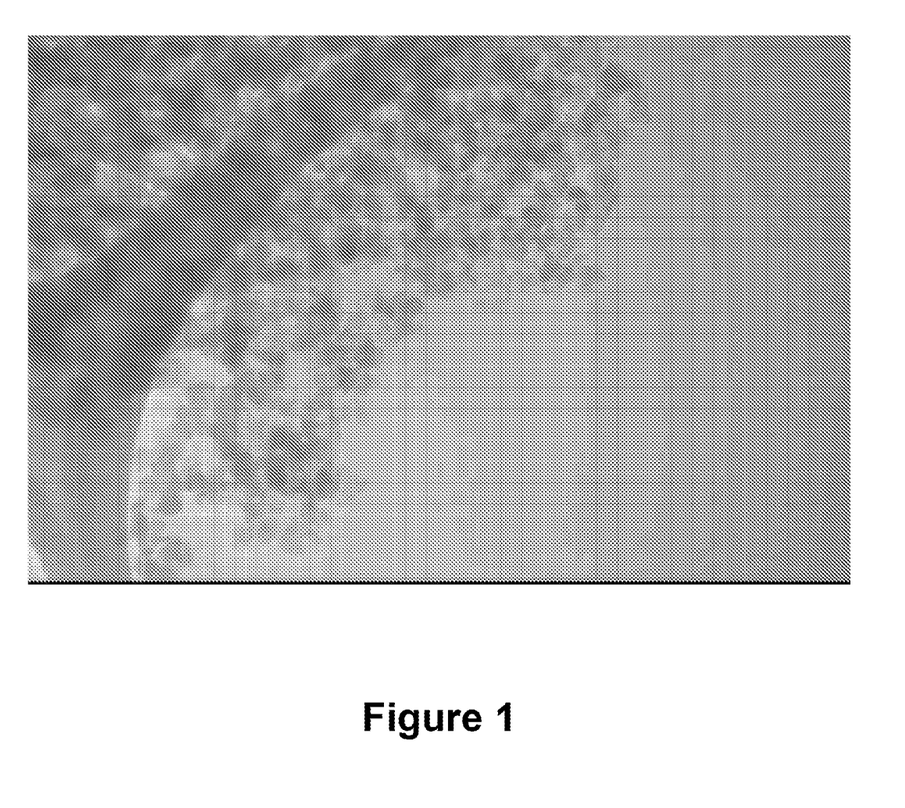
FIG. 1 is TEM micrograph of silica coated carbon black.

Aluminum hydroxide activated carbon black was further coated with silica. In a typical experiment 25 g of aluminum hydroxide activated carbon black was dispersed in 2250 mL of water using a high shear mixer. The temperature of the slurry was maintained between 75-80° C. In a separate container 18.70 g of 28% sodium silicate solution was mixed with 250 mL of water. The sodium silicate solution was treated with ion-exchange resin and finally added to the carbon black slurry at the rate of 4 mL/min. The pH of the solution was maintained around 4 using aqueous solutions of sodium hydroxide and hydrochloric acid. FIG. 1 shows a micrograph of carbon black after silica coating. As can be observed from the micrograph, the sorbent is basically an aggregate of individual nanoparticles in the range of 20-50 nm, which forms a large particle with highly accessible surface. Thermo gravimetric analysis of silica coated carbon black showed that the silica content in the coated powder is 12-15%.

1.c Sulfur Modification of Silica Coated Carbon Black with Thiol Group

The surface of the silica coated carbon particles was modified with 3-(Mercaptopropyl)trimethoxysilane (($HS(CH_2)_3Si(OCH_3)$)) (hereafter mercaptosilane). In a typical synthesis experiment, 5 grams of silica coated carbon is dispersed in 200 mL of toluene containing 5 grams of mercaptosilane. The solution was stirred and refluxed for 4 hours. After reflux was completed, the solution was filtered and washed with ethanol and dried in air. The sample hereafter is designated as C1. The surface area of C1 was 141 $m^2/g$. The surface area of uncoated carbon black was 260 $m^2/g$. The sulfur content of this sample was 2.66 wt % of the total mass of the powder.

1.d Surface and Particle Characteristics of C1

Figure 2:
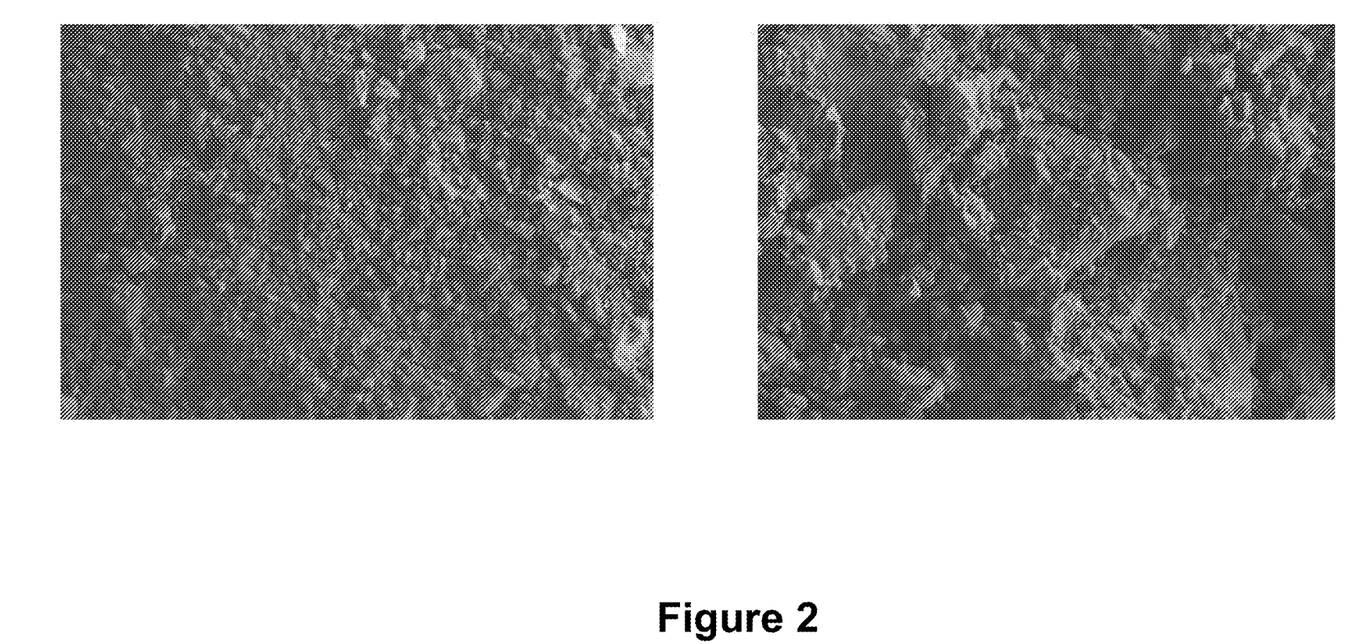
FIG. 2 is SEM micrographs, at various magnifications, of a first embodiment of the sorbent of the present invention (designated as "C1")
Figure 3:
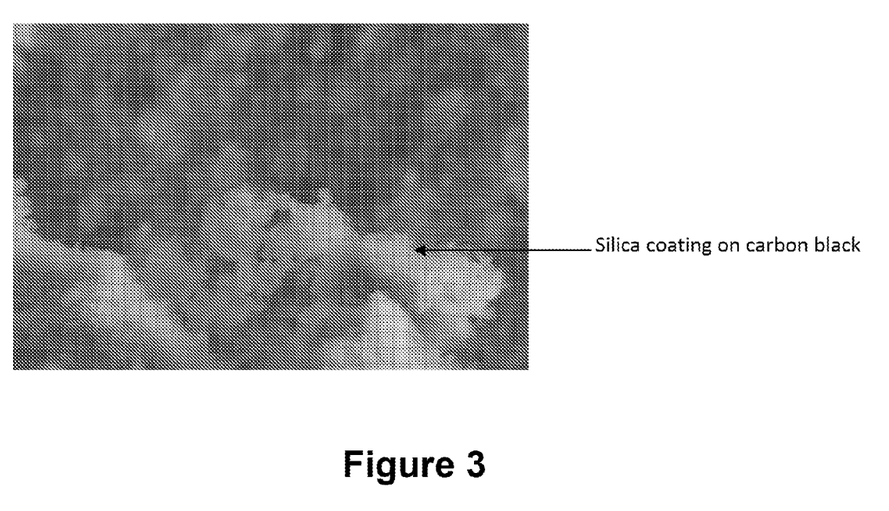
FIG. 3 is a SEM micrograph of C1 at high magnification, showing silica layer.
Figure 4:
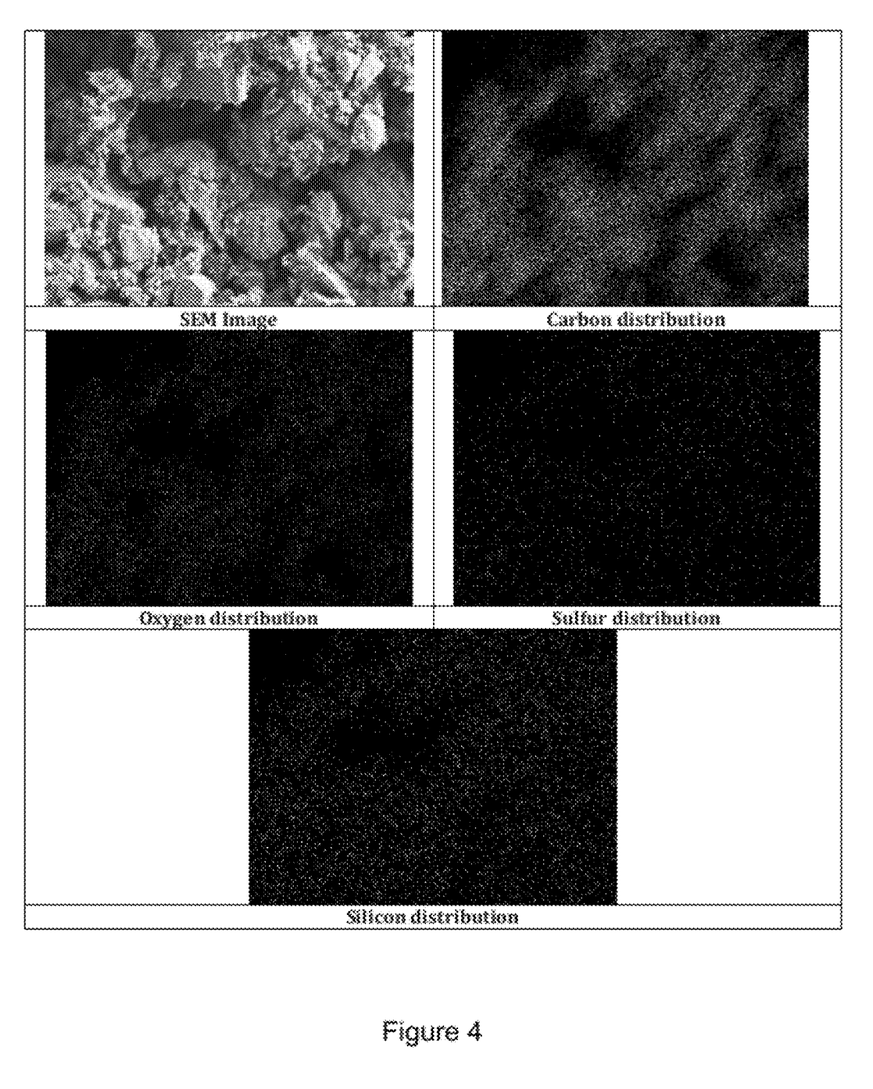
FIG. 4 depicts elemental distribution on the surface of C1.
Figure 5:
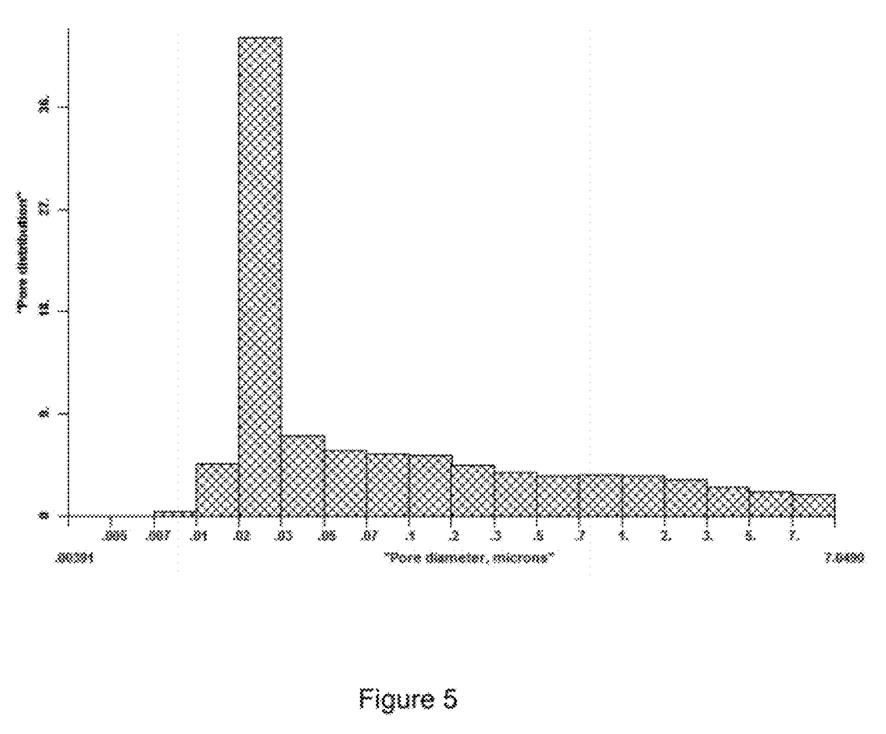
FIG. 5 depicts pore size distribution of uncoated carbon black.
Figure 6:
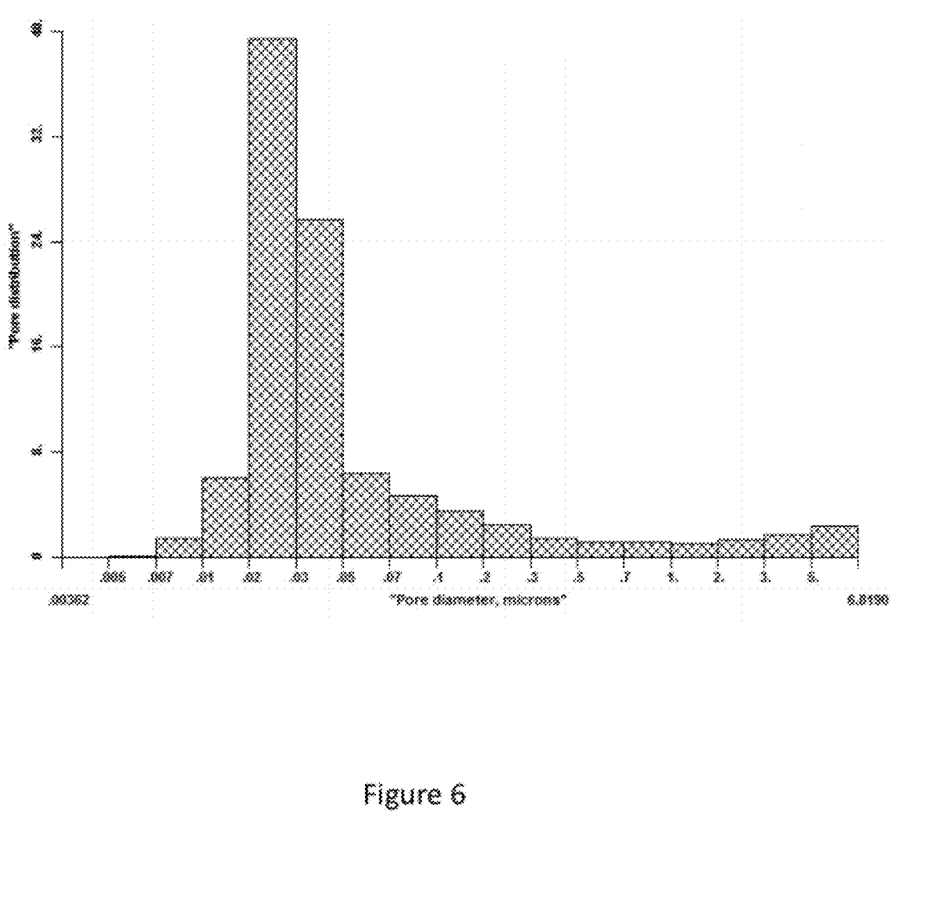
FIG. 6 depicts pore size distribution of C1.

C1 was characterized with a scanning electron microscope (SEM), to determine the powder morphology. FIG. 2 shows C1 at various magnifications. The sorbent particles are in the range of 5-20 µm. These particles are aggregates of small carbon black particles, which are ~50 nm in size. FIG. 3 shows the surface of a particle at higher magnification. The micrographs show the silica layer (light color) on the surface. This indicates that silica is indeed coated on the surface of carbon black. FIG. 4 shows the elemental mapping of the sorbent particles. Electron Dispersive Spectrometry (EDS) was used for elemental mapping. The mapping shows the uniform distribution of silicon (from silica) and sulfur throughout the sorbent. FIG. 5 shows the pore size distribution of unmodified carbon black and FIG. 6 shows the pore size distribution of C1. Mercury porosimetry was used to determine the pore size distribution. The increase in the number of pores with a diameter in the range of 30-50 nm in the case of mercapto modified silica-coated carbon black is due to the silica coating on the surface of carbon black, which forms another layer of porous surface. The marginal decrease in the number of pores with a diameter in the range of 200-5000 nm is due to the filling of some of the pores with silica. However, there is not a significant difference between the distribution of large pores (100-5000 nm), indicating that the silica coating and mercapto modification have not significantly altered the pore size distribution and that the internal surface is still accessible to liquid.

1.e Performance of C1 in Removing Mercury from Water

Figure 7:
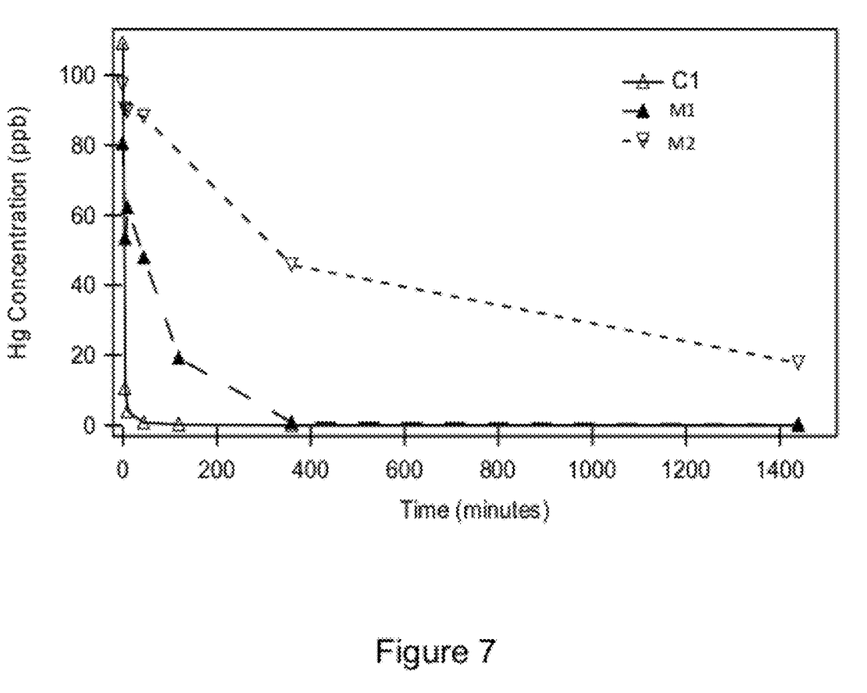
FIG. 7 depicts mercury sorption kinetics of C1, along with M1 and M2, which are commercially available sorbents, designed specifically for mercury removal from water.
Figure 8:
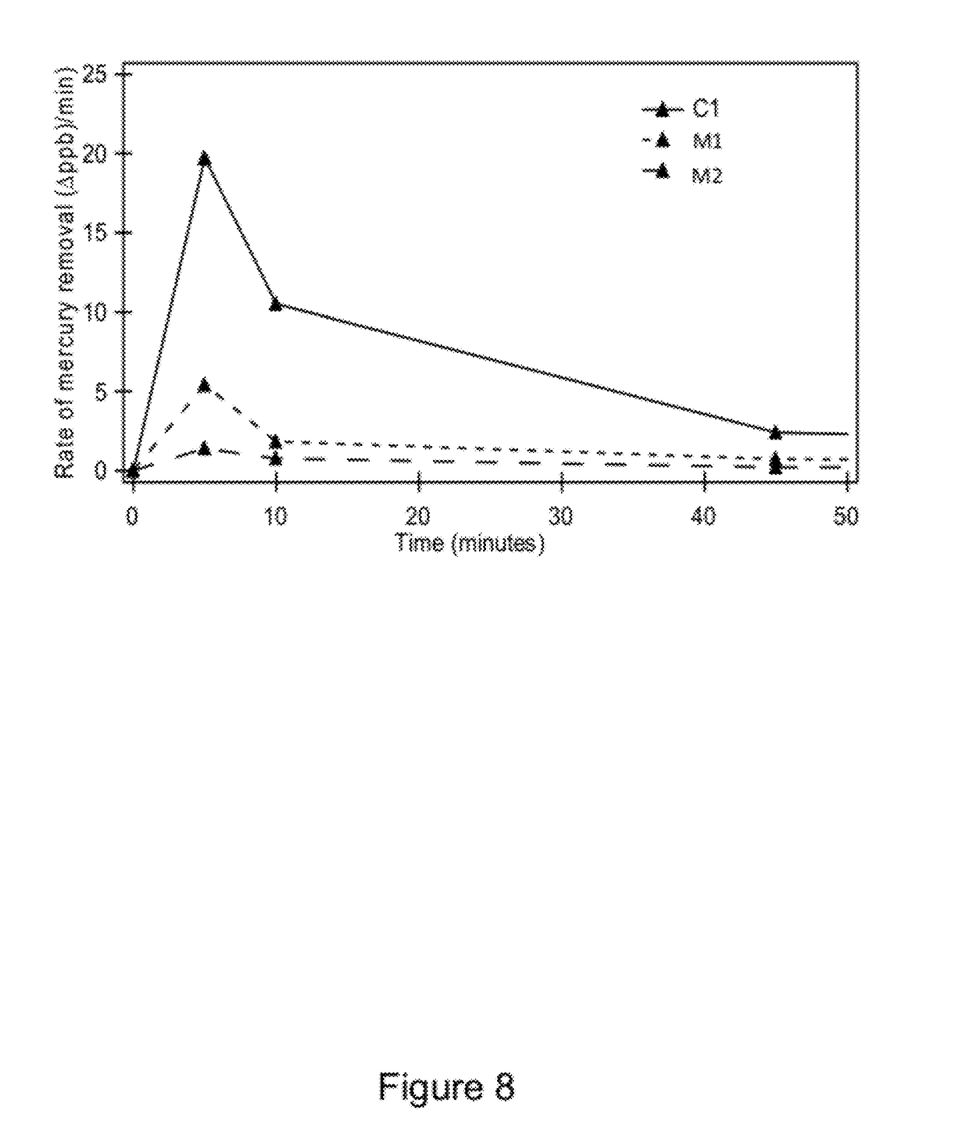
FIG. 8 depicts rate of mercury removal rate of C1 during initial stages of experiment.

The efficacy of C1 was tested using an aqueous solution of Hg ions. Two commercial sorbents, designated M1 and M2 herein, were tested simultaneously under identical test conditions. The mercury ion concentration in artificially contaminated water was ~100 ppb. FIG. 7 shows the mercury sorption kinetics of C1, compared with M1 and M2. The sorption kinetics of C1 is significantly faster than that of the commercial sorbets. FIG. 8 shows the rate of mercury removal during the initial stages of the experiments, demonstrating a faster rate of mercury removal by C1. C1 reached 99%+mercury removal in less than 45 minutes compared to M1, which took 360 minutes, and M2 which had only 81.71% removal after 24 hours when the test was stopped. The high rate of removal in the case of C1 is attributed to its unique microstructure. The combination of the open pore structure of carbon black and highly accessible thiol groups on the silica coating leads to immediate contact of mercury ions present in contaminated water with thiol groups on the surface of the sorbent. This is in contrast to M2, a high surface area activated carbon (surface area ~1000 $m^2/g$), but with low accessible internal surface area that leads to its slow reaction kinetics to remove mercury from water. On the other hand, M1, a resin-based sorbent, has an open structure as functional groups are immobilized on polymer beads, but has low surface area leading to reduced number of functional groups that can be immobilized on its surface. The microstructure of C1 circumvents these problems with its unique high surface area open structure, as discussed above. The mercury sorption capacity for C1 was 0.217 mg of mercury/g of sorbent, when tested at low mercury concentration (100 ppb). All the mercury in the solution was adsorbed. The sorption capacity for C1 was also higher than both M1 (~0.16 mg of mercury/g of sorbent) and M2 (0.159 mg of mercury/g of sorbent). This observation also demonstrates the need for high internal accessible area.

Figure 9:
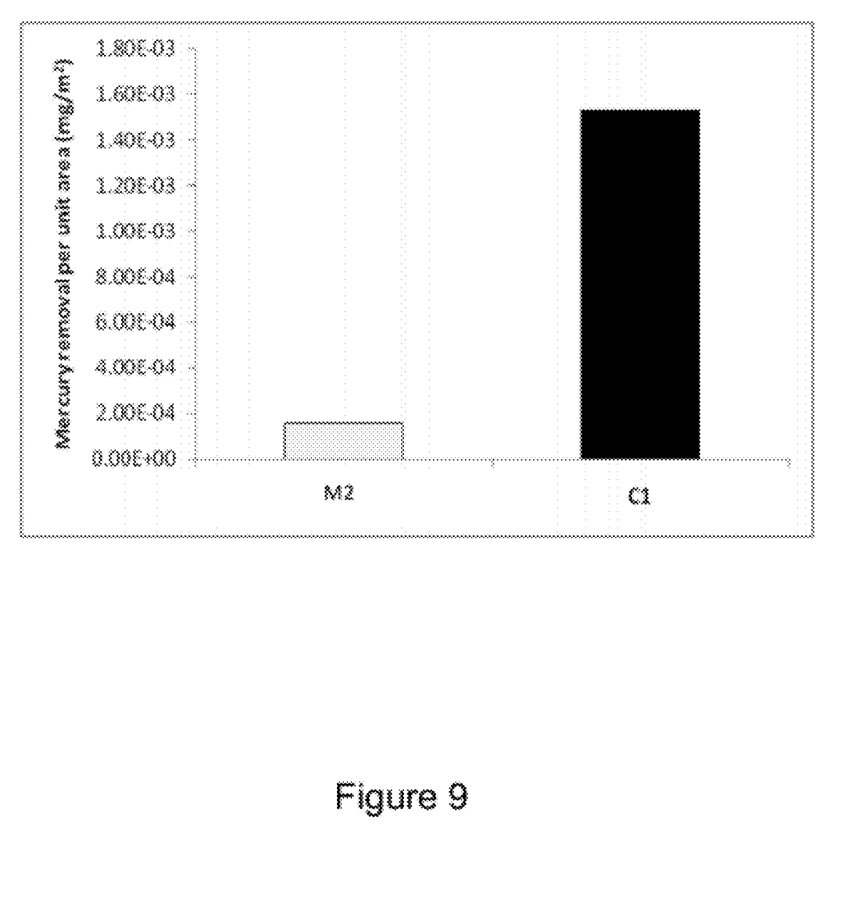
FIG. 9 depicts mercury removal per unit area of sorbent.
Figure 10:
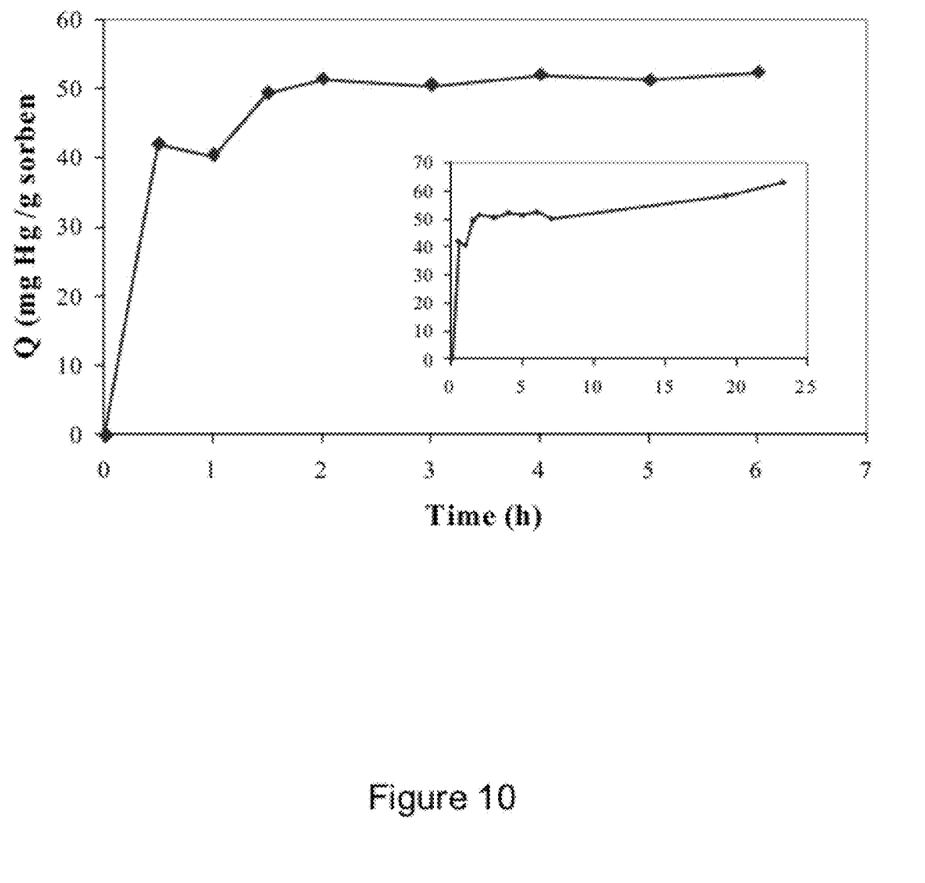
FIG. 10 depicts mercury adsorption kinetics of C1 at higher mercury concentration (100 ppm)

FIG. 9 shows the mercury removal per unit area of the sorbent. As can be observed, mercury removal per unit area for C1 is an order of magnitude higher than M2, even though the specific area of M2 is significantly higher (1000 $m^2/g$ vs. 141 $m^2/g$). C1 was also tested at higher concentrations of mercury (~200 ppm). FIG. 10 shows the kinetics data for the adsorption capacity of C1 sorbent at higher mercury concentration. It took only 30 minutes for the sorbent to reach 50% of its adsorption capacity. Further, in less than 2 hours, the sample reached 80% of its adsorption capacity, indicating most of the capacity is achieved quickly. The Q (capacity) vs. t (time) graph indicates that the active adsorption sites are readily available and the internal mass transfer (diffusion) is not a rate-limiting step. The final sorption capacity for C1 sorbent after 24 hours was 83 mg of mercury/g of sorbent. This in contrast to a third commercial activated carbon based sorbent (M3), which has a capacity of 46 mg of mercury/g of sorbent, even though it has a high specific surface area of ~600 $m^2/g$.

Example 2

Synthesis and Performance of Calcium Polysulfide ($CaS_x$) Modified Carbon Black Based Sorbent 2.a Synthesis of $CaS_x$-Based Sorbent Initially, carbon black was coated with silica, using the method described in 1.a and 1.b. Subsequently, the surface of the silica coated carbon black was modified with calcium polysulfide. In a typical synthesis, 5 grams of silica coated carbon is dispersed in 250 mL of water with 2.15 grams of calcium polysulfide. The solution is mixed for 1.5 hours and then placed in a roto-evaporator to remove all the solvent, resulting in a surface-modified powder. This powder was heat treated at 300° C. for 2 hours in air to decompose the $CaS_x$ and to bond sulfur with the silica layer on the surface of the carbon. This prevents the sulfur from potentially going back into the solution. This sample hereafter is designated as C2. The specific surface area of this sample was 163 $m^2/g$.

2.b Performance of C2 in Removing Mercury from Water

Figure 11:
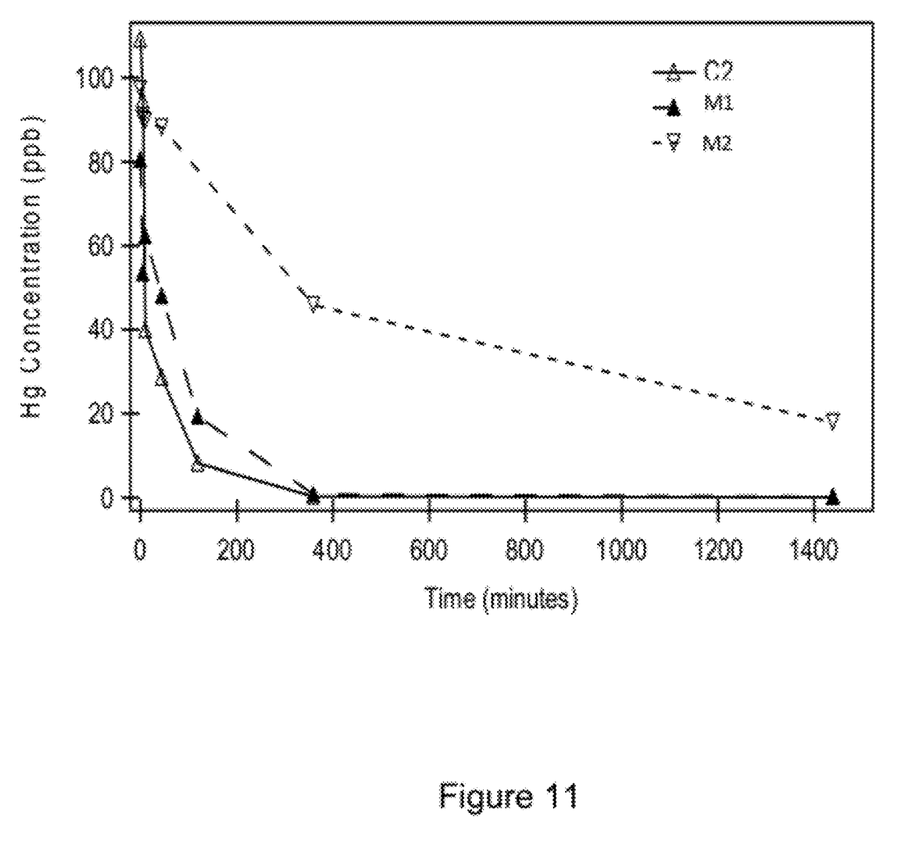
FIG. 11 depicts mercury adsorption kinetics of a second embodiment of the sorbent of the present invention (designated as "C2")
Figure 12:
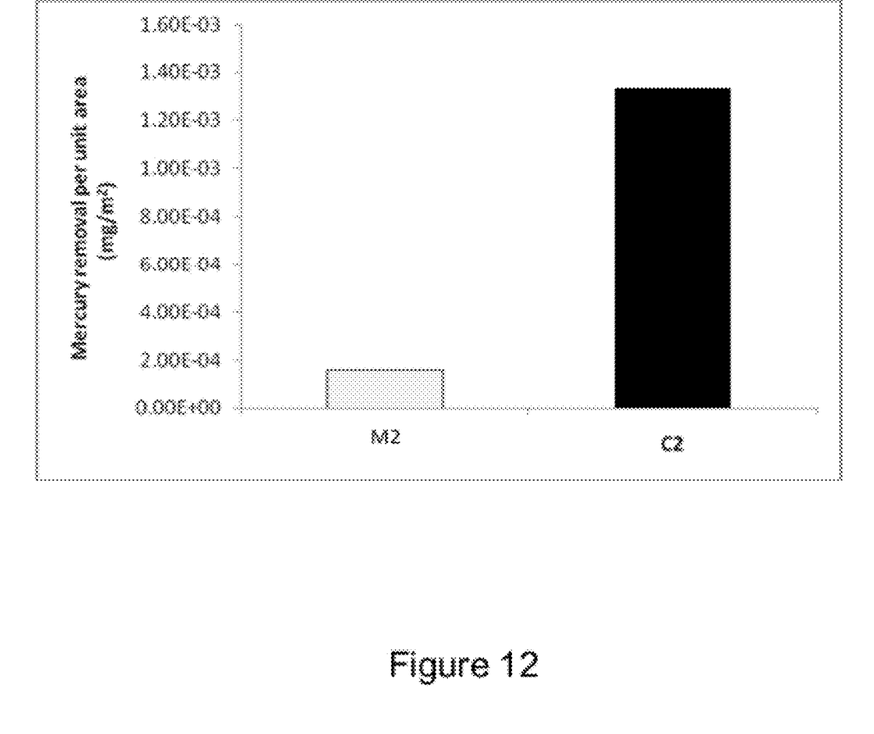
FIG. 12 depicts mercury removal per unit area of C2.

The efficacy of C2 was tested using an aqueous solution of Hg ions. As before, M1 and M2 were tested simultaneously under identical test conditions. The mercury ion concentration in artificially contaminated water was ~100 ppb. FIG. 11 shows the mercury adsorption kinetics of C2. The adsorption kinetics is still better than that of M1 and M2. The slower kinetics of $CaS_x$-modified sorbent (C2), compared to mercapto modified sorbent (C1), is likely due to the stronger affinity of thiol group towards mercury ions compared to sulfur. The mercury sorption capacity for C2 (~0.22 mg of Hg/g of sorbent) was also higher than M1 (~0.16 mg of Hg/g of sorbent) and M2 (0.159 mg of Hg/g of sorbent). FIG. 12 shows the mercury removal per unit area for C2 and M2. Again mercury removal per unit area of C2 is an order of magnitude higher than M2, further strengthening the claim for the need for high internal accessible area.

Example 3

Synthesis and Performance of Aggregated Mercapto Modified Carbon Black Sorbent

Figure 13:
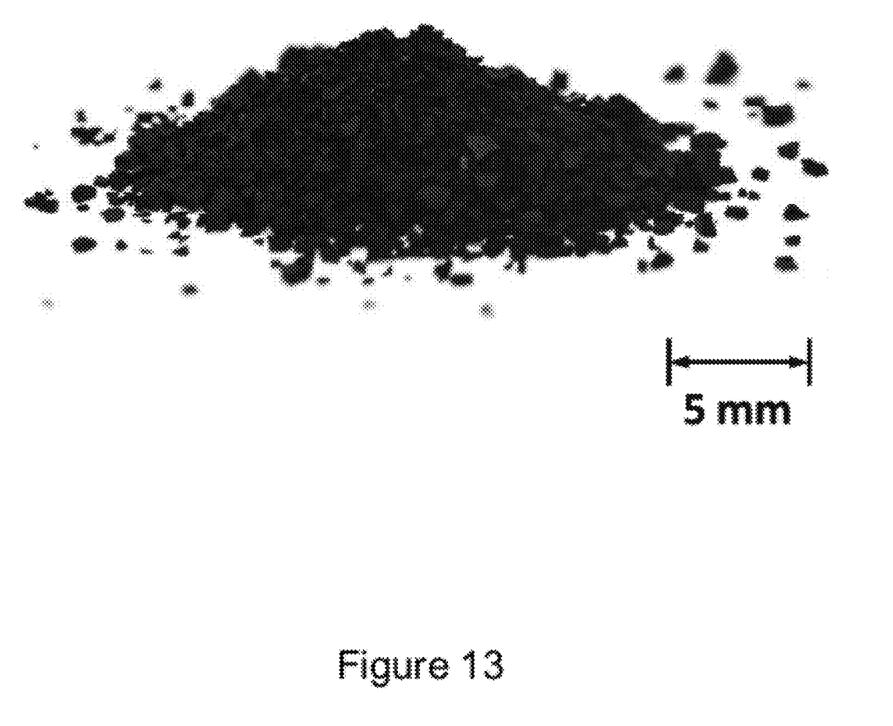
FIG. 13 is a photograph of a third embodiment of the sorbent of the present invention (designated as "C3")

In order to enable the use of a sorbent in a practical application, the nanoparticles need to be aggregated to 20-50 µm size particles. Further, in order to use the sorbent in either a column or a cartridge, it is preferred that the particles are further aggregated into millimeter size "pieces". Hence, we modified the method, described in 1.c, to synthesize aggregated mercapto-modified carbon black based sorbent. Initially, silica-coated carbon black (synthesized using the method described in section 1.a and 1.b) was dispersed in ethanol, followed by the addition of tetraethoxysilane (TEOS) and acetic acid. The hydrolization of TEOS leads to aggregation of silica-coated carbon black particles. Subsequently, aggregated silica-coated carbon black particles were functionalized with mercaptosilane using a method similar to the method described in section 1.c. This sample is hereafter designated as C3. FIG. 13 shows the photograph of aggregated sorbent. The surface area of C3 is 138 m$^2$/g.

Figure 14:
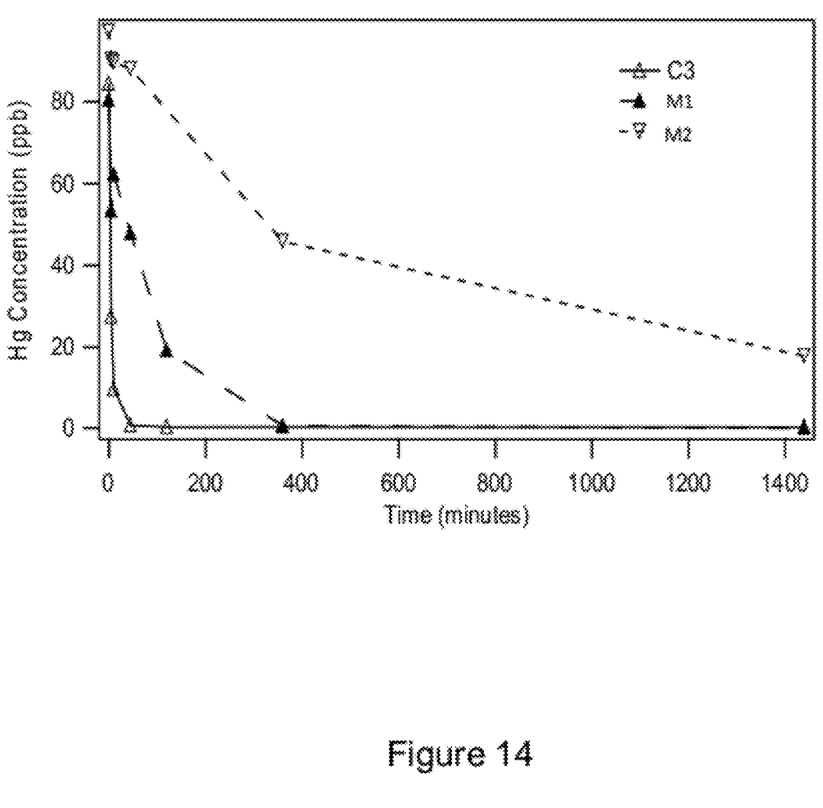
FIG. 14 depicts mercury adsorption kinetics of C3.

FIG. 14 shows the mercury adsorption kinetics for C3. The adsorption kinetics is similar to C1 and significantly better than M1 and M2. This shows that the unique microstructure of the sorbent leaves the internal surface highly accessible, even though the sorbent itself is an aggregate in the size range of ~1 mm.

The present invention clearly demonstrates that an open pore structure with suitable surface modification can lead to a highly efficient sorbent to remove mercury from water.

As is well known, the formula parameters set forth herein are for example only, such parameters can be scaled and adjusted in accordance with the teaching of this invention. This invention has been described with respect to preferred embodiments. However, those skilled in the art will recognize modifications and variations in the specific details which have been described and illustrated may be resorted to, without departing from the spirit and scope of the invention as defined in the appended claims.

We claim:

1. A sorbent in the form of a powder to remove mercury from water, comprising:
    a) an inorganic substrate;
    b) a metal oxide layer on the surface of the substrate;
    c) a tying layer disposed between the inorganic substrate and the metal oxide layer to increase the adhesion between the inorganic substrate and the metal oxide layer, said tying layer comprising at least one of aluminum hydroxide, titanium hydroxide, magnesium hydroxide, iron hydroxide, and copper hydroxide; and
    d) sulfur containing functional groups on the surface of the metal oxide layer.

2. The sorbent as claimed in claim 1 wherein said substrate is composed of at least carbon, ceramic oxides, ceramic non-oxides, or clay-based particles.

3. The sorbent as claimed in claim 1 wherein said substrate comprises carbon black.

4. The sorbent as claimed in claim 1, wherein said metal oxide layer comprises at least one of silicon oxide, aluminum oxide, titanium oxide, iron oxide and tin oxide.

5. The sorbent as claimed in claim 1, wherein said metal oxide layer further includes sulfur containing molecules to increase its mercury removal efficiency from water.

6. The sorbent as claimed in claim 5, wherein said sulfur molecules comprise at least one of: mercaptosilane, calcium polysulfide, mercapto acetic acid, and elemental sulfur.

7. The sorbent as claimed in claim 1, where the concentration of metal oxide layer on the substrate comprises 7-16 wt % of the total powder.

8. The sorbent as claimed in claim 1, wherein the concentration of metal oxide layer on the substrate comprises 10-12 wt % of the total powder.

9. The sorbent as claimed in claim 1, wherein the concentration of sulfur on the metal oxide layer comprises 2-10 wt % of the total powder.

10. An improved carbon based sorbent in the form of a powder to remove mercury form water, comprising:
    a) a carbon substrate;
    b) a metal oxide later on the surface of the carbon substrate;
    c) a tying layer disposed between the carbon substrate and the metal oxide layer to increase the adhesion between the carbon substrate and the metal oxide layer, said tying layer comprising at least one of aluminum hydroxide, titanium hydroxide, magnesium hydroxide, iron hydroxide, and copper hydroxide; and
    d) sulfur containing functional groups on the surface of metal oxide layer.

11. The sorbent as claimed in claim 10, wherein said metal oxide layer comprises at least one of silicon oxide, aluminum oxide, titanium oxide, iron oxide and tin oxide.

12. The sorbent as claimed in claim 10, wherein said metal oxide layer further includes sulfur containing functional groups to increase its mercury removal efficiency from water.

13. The sorbent as claimed in claim 10, wherein said sulfur molecules comprise at least one of: mercaptosilane, calcium polysulfide, mercapto acetic acid, and elemental sulfur.

14. The sorbent as claimed in claim 10 wherein said substrate comprises carbon black.

15. The sorbent as claimed in claim 10, wherein the concentration of metal oxide layer on the substrate comprises 7-16 wt % of the total powder.

16. The sorbent as claimed in claim 10, wherein the concentration of sulfur on the metal oxide layer comprises 2-10 wt % of the total powder.

17. A process for producing a sorbent to remove mercury from water, comprising:
    a) providing an inorganic substrate;
    b) depositing a tying layer on the inorganic substrate to increase the adhesion between the inorganic substrate and subsequent layers, said tying layer comprising at least one of aluminum hydroxide, titanium hydroxide, magnesium hydroxide, iron hydroxide, and copper hydroxide;
    c) depositing a metal oxide layer on the tying layer; and
    d) functionalizing the metal-oxide layer with sulfur containing groups.

18. The process as claimed in claim 17, wherein said inorganic substrate comprises carbon black.

19. The process as claimed in claim 17, wherein said metal oxide layer comprises silica.

20. The process as claimed in claim 17, wherein said sulfur molecules comprise least one of: mercaptosilane, calcium polysulfide, mercapto acetic acid, and elemental sulfur.

21. The process as claimed in claim 17 wherein said inorganic substrate is composed of at least carbon, ceramic oxides, ceramic non-oxides, or clay-based particles.

* * * * *